United States Patent
McKenney

(10) Patent No.: US 7,814,082 B2
(45) Date of Patent: *Oct. 12, 2010

(54) EFFICIENT SUPPORT OF CONSISTENT CYCLIC SEARCH WITH READ-COPY-UPDATE

(75) Inventor: Paul E. McKenney, Beaverton, OR (US)

(73) Assignee: International Business Machines Corporation, Armonk, NY (US)

(*) Notice: Subject to any disclaimer, the term of this patent is extended or adjusted under 35 U.S.C. 154(b) by 262 days.

This patent is subject to a terminal disclaimer.

(21) Appl. No.: 12/050,559

(22) Filed: Mar. 18, 2008

(65) Prior Publication Data

US 2008/0177742 A1    Jul. 24, 2008

Related U.S. Application Data

(63) Continuation of application No. 10/795,941, filed on Mar. 8, 2004, now Pat. No. 7,426,511.

(51) Int. Cl.
    *G06F 17/00* (2006.01)
(52) U.S. Cl. ............... 707/704; 707/705; 707/802; 711/147; 711/151; 711/152; 711/170
(58) Field of Classification Search ............ 707/609, 707/704, 705, 802; 710/200; 711/102, 104, 711/116, 138
See application file for complete search history.

(56) References Cited

U.S. PATENT DOCUMENTS

| | | | |
|---|---|---|---|
| 5,727,209 A | 3/1998 | Slingwine et al. | |
| 5,758,148 A | 5/1998 | Lipowski | |
| 6,108,747 A | 8/2000 | Kaganoi | |
| 6,249,784 B1 | 6/2001 | Macke et al. | |
| 6,886,162 B1 | 4/2005 | McKenney | |
| 6,920,469 B2 * | 7/2005 | Cooke et al. | 707/617 |
| 2001/0003189 A1 * | 6/2001 | Miyazawa et al. | 709/206 |

OTHER PUBLICATIONS

P. McKenney et al., "Read-Copy Update," Jul. 2001, Ottawa Linux Symposium, pp. 1-22.*
"Read-Copy Update Mutual-Exclusion in Linux," <http://lse.sourceforge.net/locking/rcu/rcupdate_doc.html>, Feb. 5, 2002.

* cited by examiner

*Primary Examiner*—Fred I Ehichioya
(74) *Attorney, Agent, or Firm*—Walter W. Duft

(57) ABSTRACT

A method, system and computer program product for modifying data elements in a shared data element group that must be updated atomically for the benefit of readers requiring group integrity. A global generation number is associated with the data element group and each member receives a copy of this number when it is created. Each time an update is performed, the global generation number is incremented and the updated element's copy of this number is set to the same value. For each updated data element, a link is maintained from the new version to the pre-update version thereof, either directly or using pointer-forwarding entities. When a search is initiated, the current global generation number is referenced at the commencement of the search. As data elements in the group are traversed, the reader traverses the links between new and old data element versions to find a version having a matching generation number, if any. Following the occurrence of a grace period in which all readers have passed through quiescent states, all old data element versions are freed.

21 Claims, 16 Drawing Sheets

EFFICIENT SUPPORT OF CONSISTENT CYCLIC SEARCH WITH READ-COPY-UPDATE

This application is a continuation under 35 U.S.C. 120 of application Ser. No. 10/795,941, filed Mar. 8, 2004, entitled "Efficient Support Of Consistent Cyclic Search With Read-Copy Update."

BACKGROUND OF THE INVENTION

1. Field of the Invention

The present invention relates to computer systems and methods in which data resources are shared among concurrent data consumers while preserving data integrity and consistency relative to each consumer. More particularly, the invention concerns improvements to a mutual exclusion mechanism known as "read-copy update," in which lock-free data read operations run concurrently with data update operations.

2. Description of the Prior Art

By way of background, read-copy update is a mutual exclusion technique that permits shared data to be accessed for reading without the use of locks, writes to shared memory, memory barriers, atomic instructions, or other expensive synchronization mechanisms, while still permitting the data to be updated (modify, delete, insert, etc.) concurrently. The technique is well suited to multiprocessor computing environments in which the number of reader processes accessing a shared data set is large in comparison to the number of updater processes, and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first phase, the actual data update is carried out in a manner that temporarily preserves two views of the data being updated. One view is the old (pre-update) data state that is maintained for the benefit of operations that may be currently referencing the data. The other view is the new (post-update) data state that is available for the benefit of operations that access the data following the update. In the second phase, the old data state is removed following a "grace period" that is long enough to ensure that all executing operations will no longer maintain references to the pre-update data.

FIG. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables.

It is assumed that the data element list of FIGS. 1A-1D is traversed (without locking) by multiple concurrent read-side processes (readers) and occasionally updated by update processes (updaters) that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring a spinlock, allocating new memory for B', copying the contents of B to B', modifying B' as needed, updating the pointer from A to B so that it points to B', and releasing the spinlock. All subsequent (post update) readers that traverse the linked list, such as the reader r2, will thus see the effect of the update operation by encountering B'. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays.

At some subsequent time following the update, r1 will have continued its traversal of the linked list and moved its reference off of B. In addition, there will be a time at which no other reader process is entitled to access B. It is at this point, representing expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following expiration of the grace period.

In the context of the read-copy update mechanism, a grace period represents the point at which all running processes having access to a data element guarded by read-copy update have passed through a "quiescent state" in which they can no longer maintain references to the data element, assert locks thereon, or make any assumptions about data element state. By convention, for operating system kernel processes, a context (process) switch, an idle loop, and user mode execution all represent quiescent states for any given CPU (as do other operations that will not be listed here).

In FIG. 3, four processes 0, 1, 2, and 3 running on four separate CPUs are shown to pass periodically through quiescent states (represented by the double vertical bars). The grace period (shown by the dotted vertical lines) encompasses the time frame in which all four processes have passed through one quiescent state. If the four processes 0, 1, 2, and 3 were reader processes traversing the linked lists of FIGS. 1A-1D or FIGS. 2A-2C, none of these processes having reference to the old data element B prior to the grace period could maintain a reference thereto following the grace period. All post grace period searches conducted by these processes would bypass B by following the links inserted by the updater.

There are various methods that may be used to implement a deferred data update following a grace period, including but not limited to the use of callback processing as described in commonly assigned U.S. Pat. No. 5,727,209, entitled "Apparatus And Method For Achieving Reduced Overhead Mutual-Exclusion And Maintaining Coherency In A Multiprocessor System Utilizing Execution History And Thread Monitoring." The contents of U.S. Pat. No. 5,727,209 are hereby incorporated herein by this reference.

A number of variants of read-copy update have been used in different operating systems. However, all of these implementations make at least one of the following assumptions:
1) Stale data is permissible (for example, in read-copy update-protected routing tables).
2) Readers search the aggregate data structure in an acyclic manner, so that there is no possibility of a reading process seeing two different versions of the same data element during a single operation. This assumption also implies that, for data elements having multiple entry points, a given search starts with only one of these entry points.
3) There is no need for multiple data elements to be seen in a consistent aggregate state. Consistency is important only for a given data element (as, for example, the data structures used in the Linux 2.6 kernel's read-copy update-protected System V IPC (InterProcess Communication) mechanism).
4) If group consistency is important for a collection of data elements, read-copy update must be used in a manner that allows the group to be updated atomically so as to protect group integrity. For example, in the Linux 2.6 kernel, the directory-cache is protected by read-copy update, but per-entry locks are also used to ensure coordinated updates to these entries and their associated inodes. Another approach would be to make a copy of the aggregate data structure (i.e., the entire collection of data elements), update the new copy, then link the new copy in place of the old copy. However, this is extremely time consuming for large groups, and is particularly inefficient when only small changes are required.

Cyclic searches represent a situation where none of the foregoing assumptions underlying the use of read-copy update are in play. An example of a commonly used cyclic search is the traversal of a group of data elements representing a finite state machine. If these data elements change dynamically, but infrequently, in comparison to the number of read traversals, then the use of read-copy update could be advantageous. However, it will be seen that:
1) Permitting stale data could result in a reader seeing an inconsistent, and possibly nonsensical, finite state machine.
2) Traversing a finite state machine is in general an inherently cyclic activity.
3) Each reader must see a finite state machine that is consistent as a whole—consistency of a particular state is not sufficient.
4) If the finite state machine is large, implementing atomic data element group updates by group copying will be infeasible.

It is to solving the foregoing problems that the present invention is directed. In particular, what is required is a new read-copy update technique that will support the level of data group consistency required in cyclic searches and other processing environments where group integrity must be preserved relative to each reader.

SUMMARY OF THE INVENTION

The foregoing problems are solved and an advance in the art is obtained by a method, system and computer program product for modifying data elements in a shared data element group that must be updated atomically for the benefit of readers requiring group integrity. A global generation number is associated with the data element group and each member receives a copy of this number when it is created. Each time an update is performed, the global generation number is incremented and the updated element's copy of this number is set to the same value. For each updated data element, a link is maintained from the new version to the pre-update version thereof, either directly or using pointer-forwarding entities. When a search is initiated, the current global generation number is referenced at the commencement of the search. As data elements in the group are traversed, the reader traverses the links between new and old data element versions to find a version having a matching generation number, if any. Following the occurrence of a grace period in which all readers have passed through quiescent states, all old data element versions are freed.

BRIEF DESCRIPTION OF THE DRAWINGS

The foregoing and other features and advantages of the invention will be apparent from the following more particular description of exemplary embodiments of the invention, as illustrated in the accompanying Drawings, in which.

DETAILED DESCRIPTION OF EXEMPLARY EMBODIMENTS

Figure 1A:
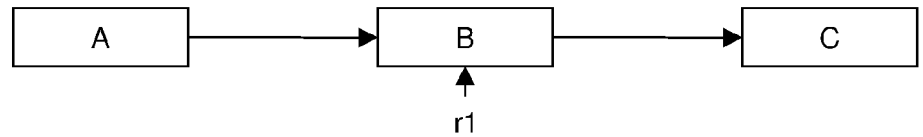
FIGS. 1A-1D are diagrammatic representations of a linked list of data elements undergoing a data element replacement according to a conventional read-copy update mechanism.
Figure 1B:
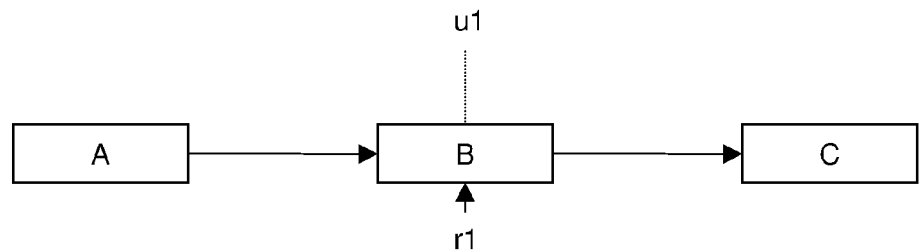
Figure 1C:
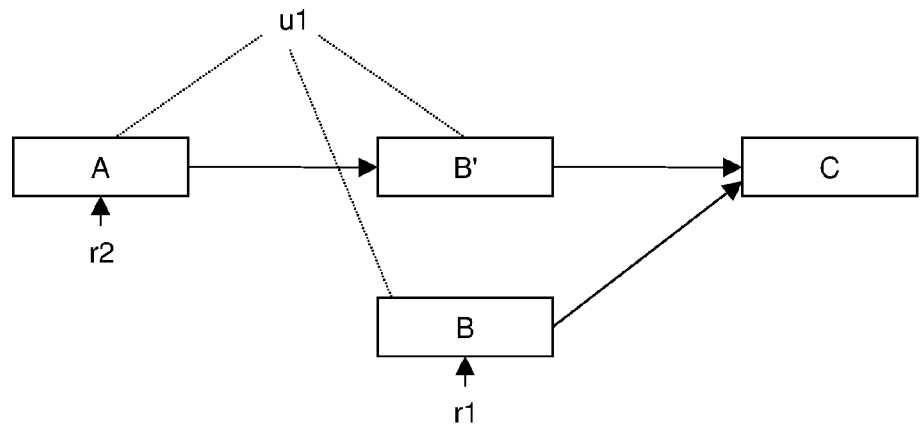
Figure 1D:
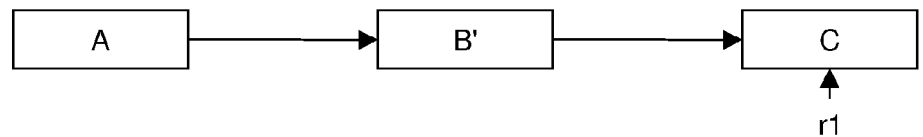
Figure 2A:
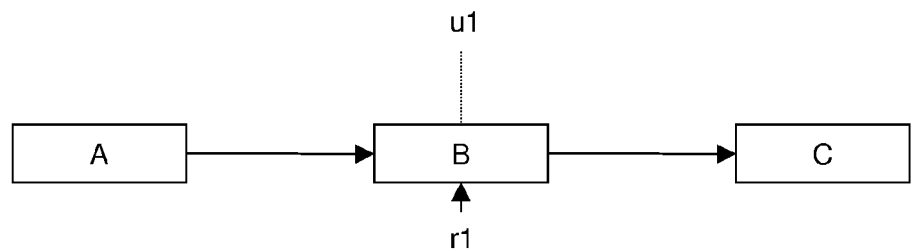
FIGS. 2A-2C are diagrammatic representations of a linked list of data elements undergoing a data element deletion according to a conventional read-copy update mechanism.
Figure 2B:
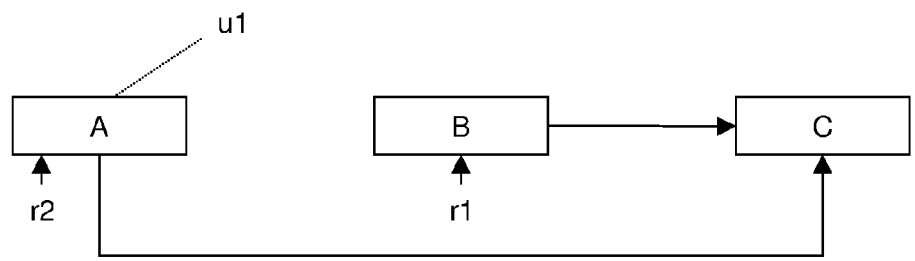
Figure 2C:
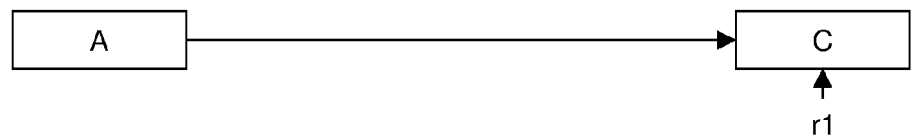
Figure 3:
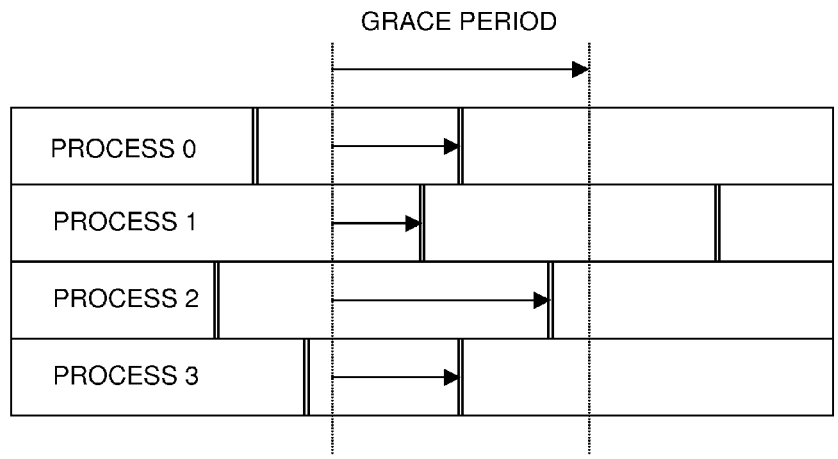
FIG. 3 is a flow diagram illustrating a grace period in which four processes pass through a quiescent state.
Figure 4:
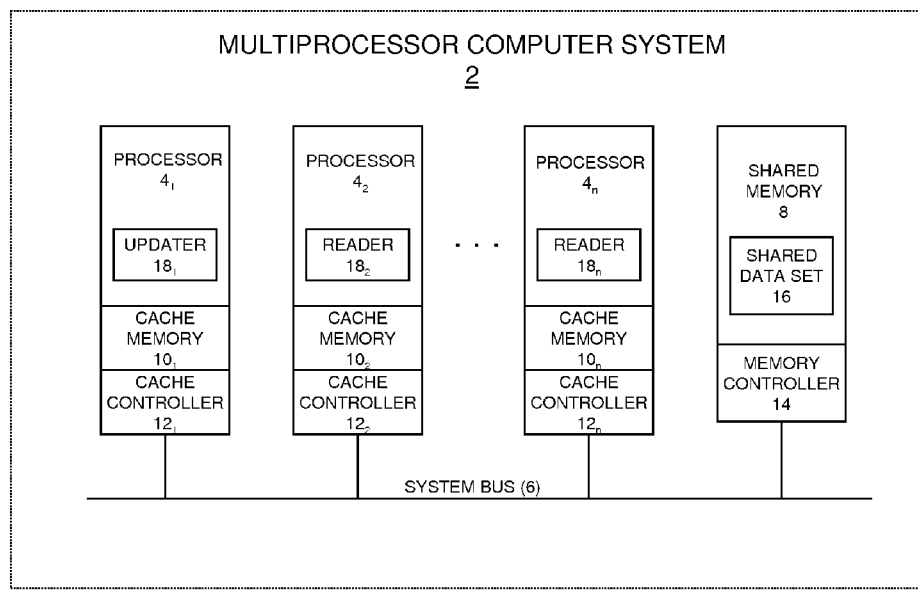
FIG. 4 is a functional block diagram showing a multiprocessor computing system that represents one exemplary environment in which the present invention can be implemented.

Turning now to the figures, wherein like reference numerals represent like elements in all of the several views, FIG. 4 illustrates an exemplary computing environment in which the present invention may be implemented. In particular, a symmetrical multiprocessor (SMP) computing system 2 is shown in which multiple processors $4_1, 4_2 \ldots 4_n$ are connected by way of a common bus 6 to a shared memory 8. Respectively associated with each processor $4_1, 4_2 \ldots 4_n$ is a conventional cache memory $10_1, 10_2 \ldots 10_n$ and a cache controller $12_1, 12_2 \ldots 12_n$. A conventional memory controller 14 is associated with the shared memory 8. The computing system 2 is assumed to be under the management of a multitasking operating system adapted for use in an SMP environment. It is further assumed that plural kernel processes executing on the several processors $4_1, 4_2 \ldots 4_n$ will, from time to time, concurrently reference a shared set 16 of data elements stored in the shared memory 8. For purposes of illustration, it will be assumed that the plural kernel processes concurrently referencing the shared data set 16 include a data updater operation ("updater") $18_1$ executing on processor $4_1$, and plural data reader operations ("readers") $18_2 \ldots 18_n$, respectively executing on processors $4_2 \ldots 4_n$.

Figure 5:
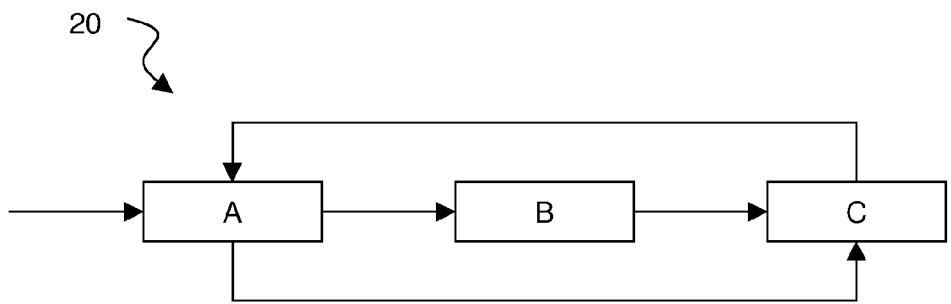
FIG. 5 is a diagrammatic representation of a group of data elements implemented as a cyclic graph that readers traverse by way of cyclic searches.

It is further assumed that the shared data set 16 represents a group of data elements that must be updated atomically so that readers are presented with a consistent view of the data during any given read operation. FIG. 5 illustrates an example of such a data group in the form of a cyclic graph 20 comprising a linked set of data elements A, B and C. As mentioned by way of background above, these linked data elements can be constituted using any suitable programming construct, including but not limited to C-language "struct" (data structure) variables comprising one or more data fields and one or more pointers to other elements in the data group. During a cyclic search (read operation) involving the graph 20, a reader enters the graph by following the global pointer to A. Depending on the processing result generated at A, the reader may either move to B and thence to C, or directly to C. From C, the reader returns to A. It will be seen that if any of the data elements A, B or C is modified or deleted using the conventional read-copy update mechanism, readers will be presented with an inconsistency if they reencounter the data element or find that it has been removed during the same operation. For example, if the graph 20 is a state machine, the logic of a reader encountering the updated data element may be thrown into disarray, possibly causing the reader to take an erroneous action or crash. An inconsistency problem could also occur if a new data element is added while a read operation is in progress.

Figure 6:
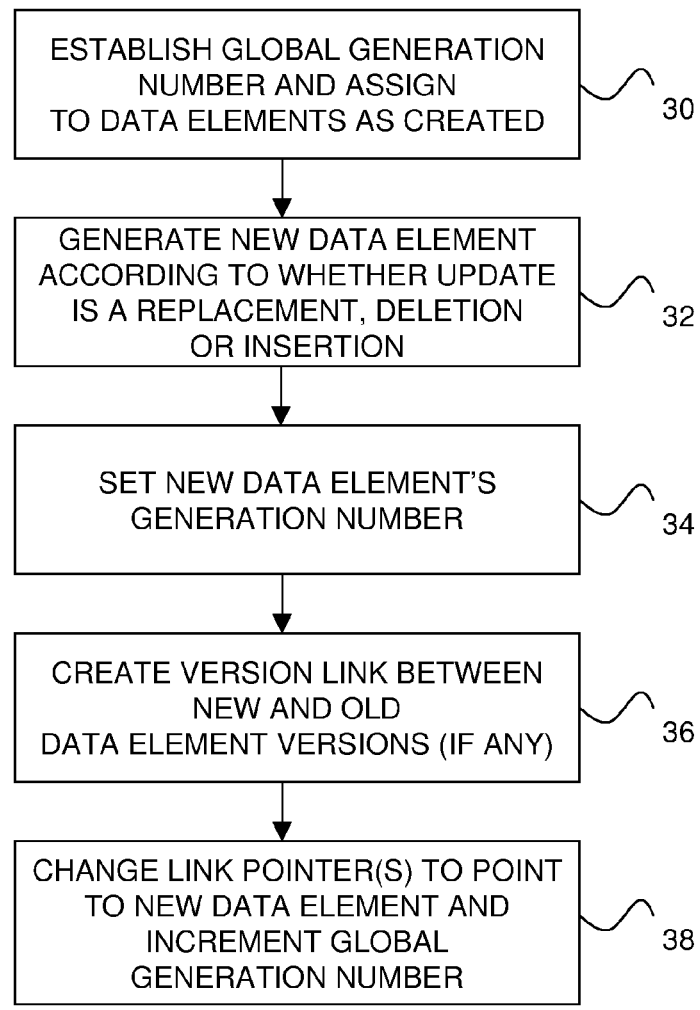
FIG. 6 is a flow diagram showing a generalized method for updating a data element group such in accordance with the invention.

FIG. 6 illustrates a generalized method that can be employed in accordance with the present invention to maintain data integrity while updating a shared data element group such as the cyclic graph 20. In an initialization step 30, a global generation number is established relative to the data element group and each data element in the group is assigned a copy of the global generation number at the time of its creation. In steps 32 and 34, an updater that wishes to replace, delete or insert a group data element generates a new data element and sets its generation number field to a value that is one greater than the current global generation number. If the updater is replacing a current data element, the new data element will be a modified copy of the current data element. If the updater is deleting a current data element, the new data element will be a copy of the current data element with a "deleted" flag set. If the updater is inserting a new data element, the new data element is created from scratch. In step 36, the updater sets version links between the new data element and its pre-update version (if such a version exists). In particular, each data element version maintains a set of two version pointers, one being an old-version pointer to a previous version of the data element (if any) and the other being a new-version pointer to a next version of the data element (if any). A NULL old-version pointer is used for any data element having no previous version (i.e., the data element has not been updated since the last grace period or is an insert). A NULL new-version pointer is used for any data element having no next version (i.e., it is the most current version). In step 38, the updater changes any link pointers that point to the old version of the data element to instead point to the new version, and then increments the global generation number.

Figure 7:
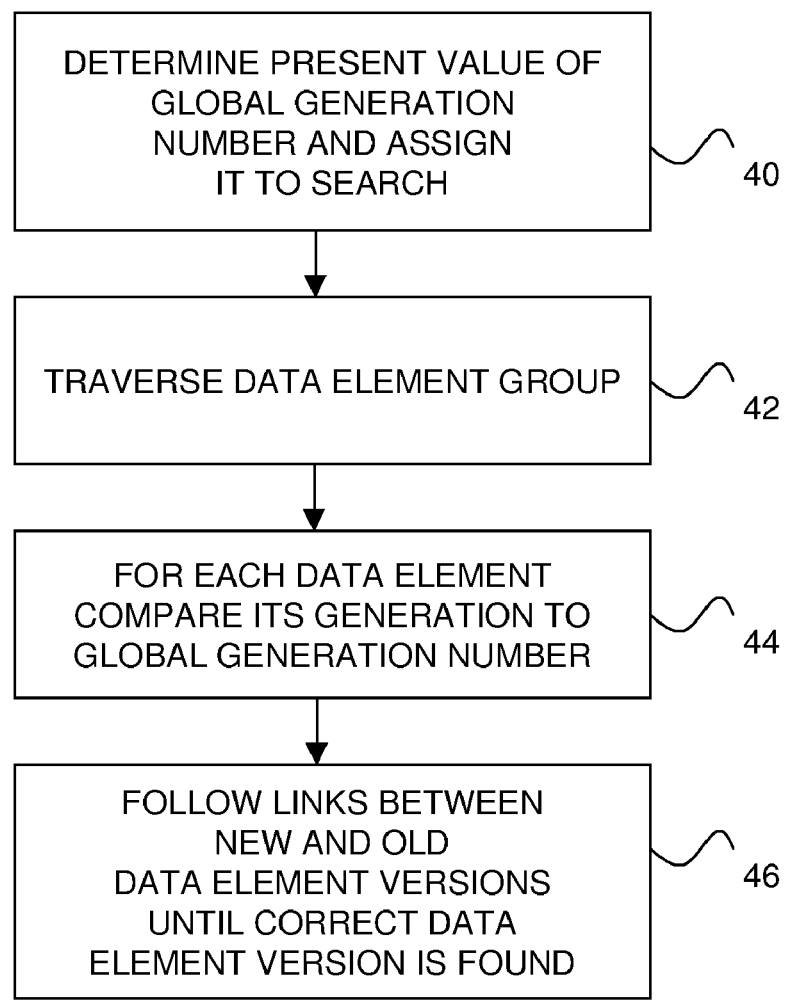
FIG. 7 is a flow diagram showing a generalized method for reading a data element group in accordance with the invention.

FIG. 7 illustrates a generalized method that can be employed in accordance with the present invention while searching (reading) a shared data element group such as that shown by the cyclic graph 20. In step 40, a reader determines the present value of the global generation number and assigns it to the search. In step 42, the reader traverses the data element group following the links between data elements. In step 44, as each data element is read the reader compares the global generation number assigned to the search with the data element's copy of the global generation number. In step 46, the reader follows the version pointers to new and old versions of the data element as necessary to find the version having a matching generation number, if any.

Figure 8A:
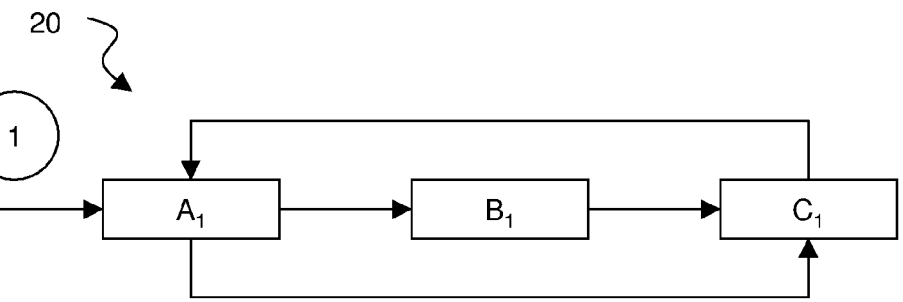
FIGS. 8A-8F are diagrammatic representations of the data element group of FIG. 5 during various stages of an update operation in which elements A and C are updated in accordance with an exemplary implementation of the invention.

Turning now to FIGS. 8A-8E, an exemplary update of the cyclic graph 20 of FIG. 5 will now be described to illustrate how the methods of FIGS. 6 and 7 can be implemented in a practical application. In FIG. 8A, the cyclic graph 20 is shown with the data elements A, B and C being in an initial state. The subscripts associated with each data element indicate generation number. The global generation number is illustrated by the circled number on the left-hand side of each figure. It is assumed that the graph 20 is to be updated by replacing data elements A and C with new versions.

Figure 8B:
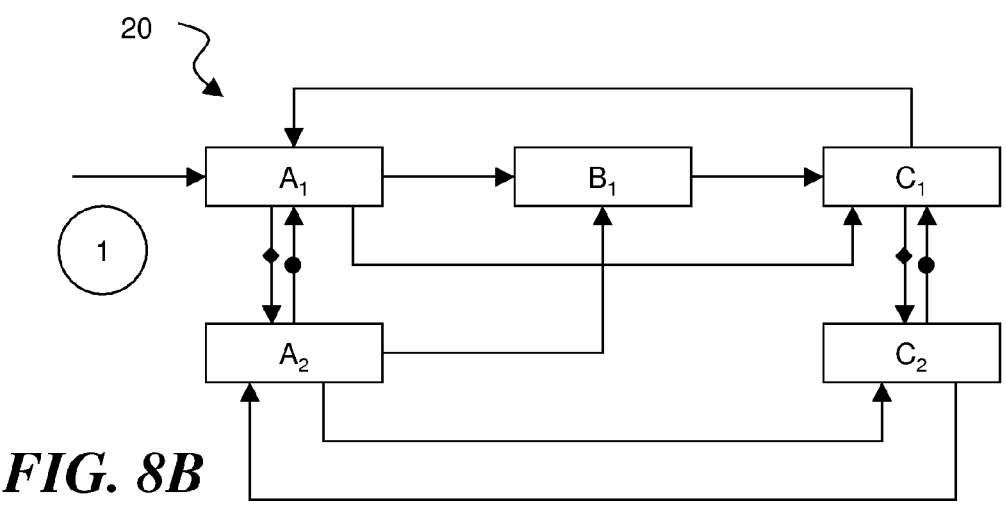

In FIG. 8B, two replacement data elements $A_2$ and $C_2$ are allocated, their corresponding fields are copied from $A_1$ and $C_1$, respectively, and the old/new-version pointers of the old and new data element versions are filled in. The arrows with the circle represent old-version pointers, and the arrows with the diamond represent new-version pointers. Version pointers having NULL values are not shown. Note that any first generation reader that enters the graph 20 at this point will proceed unaware of the new data elements because the version numbers of the data elements traversed will match the current search generation number. Such readers will not attempt to traverse the new-element pointers from $A_1$ and $C_1$ to $A_2$ and $C_2$ because there is no need to do so.

Figure 8C:
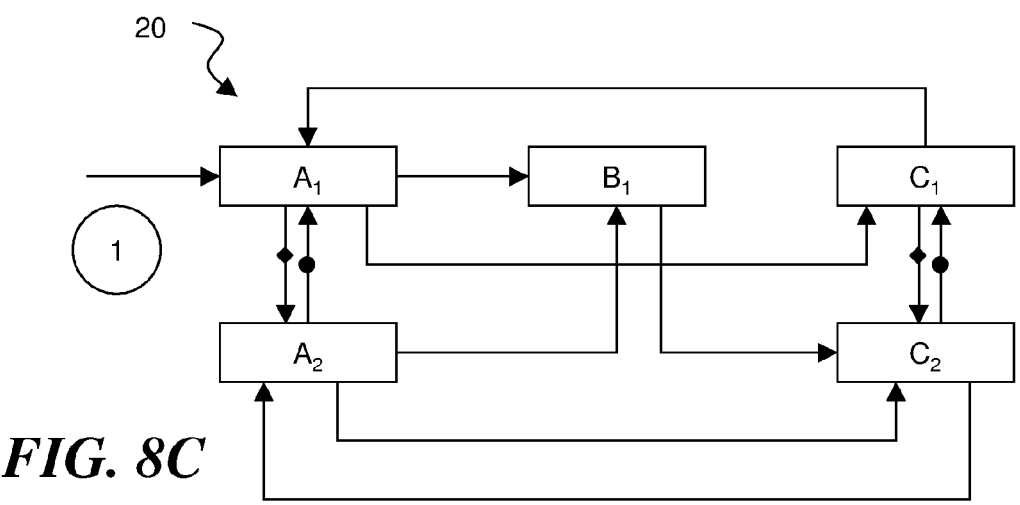

As shown in FIG. 8C, the next step is to execute any required memory-barrier instructions (which may be necessary for CPUs with weak memory consistency models) and then start changing data element link pointers to link the new data elements into the data element group. The first pointer that can be changed is the one emanating from $B_1$ (although the pointers could be updated in any order), so that $B_1$ is now linked to $C_2$. At this point, first generation readers will start encountering element $C_2$. However, according to the search method outlined above, such readers will note the generation number mismatch, and follow the old-version pointer from $C_2$ to $C_1$.

Figure 8D:
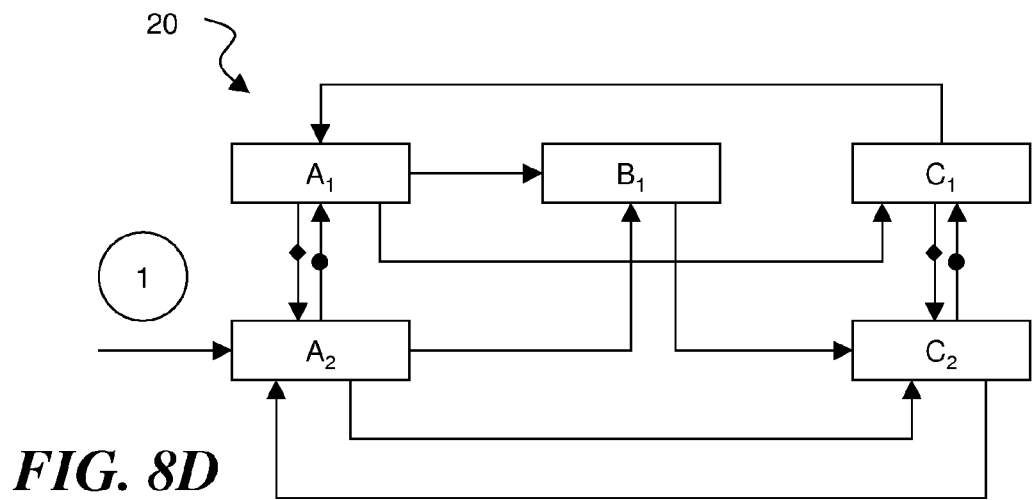

As shown in FIG. 8D, the next pointer to be updated is the global pointer. At this point, first generation readers will start encountering both $A_2$ and $C_2$, and will follow the old-version pointers upon noting the generation number mismatch.

Figure 8E:
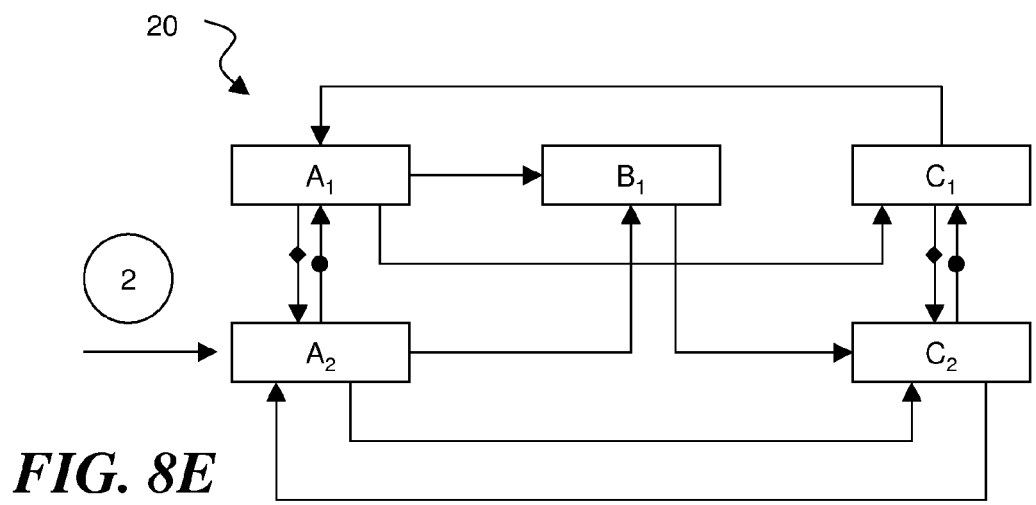

As shown in FIG. 8E, the updater completes the update by incrementing the global generation number. However, assuming no memory-barrier instructions are used at this point, readers might see the global generation number update and the global pointer update in any order. The old/new-version pointers will direct the readers to the correct data element version in either case. Although the use of memory barriers could allow some simplification of the search process in some special cases, the foregoing methodology has the advantage of generality. Note that second generation readers will still find $B_1$, but will accept it as the current version because $B_1$ has no new-version pointer.

Figure 8F:
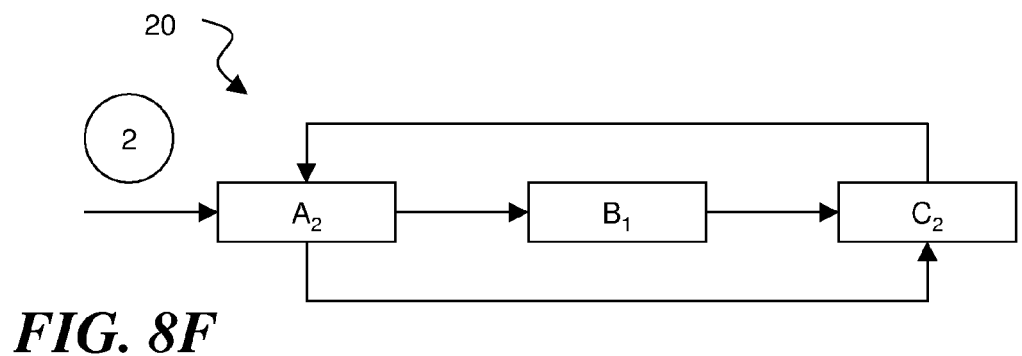

As shown in FIG. 8F, once a grace period has elapsed, old data elements $A_1$ and $C_1$ may be discarded, along with their corresponding link pointers. The old/new-version pointers for all remaining data elements are set to NULL (as necessary).

Figure 9:
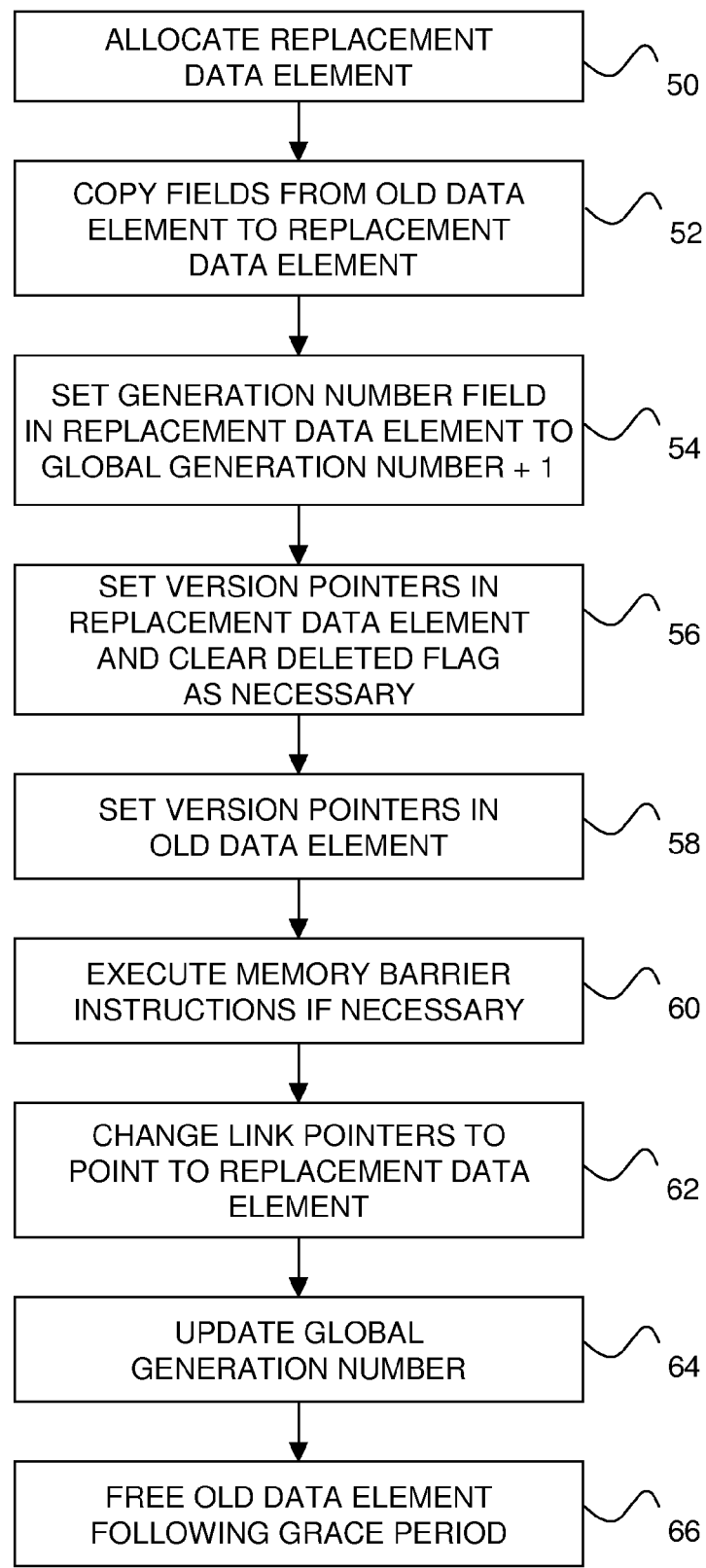
FIG. 9 is a flow diagram showing an exemplary method for replacing a group data element in accordance with the invention.

Based on the foregoing, it is now possible to describe more detailed set of exemplary methods that may be used for different types of data updates and for searches of a data group such as the graph 20. FIG. 9, for example, is a flow diagram illustrating the update logic that may be used to replace (modify) a data element in accordance with the invention. Initially, an updater (such as the updater $18_1$ of FIG. 4) will implement some form of conventional mutual exclusion to ensure data integrity during the update operation, such as locking or wait-free synchronization. Then in steps 50, 52, and 54, the updater respectively allocates a replacement data element, copies the corresponding fields from the old data element to the new version, and fills in the latter's generation-number field with a value that is one greater than the current value of the global generation number. In step 56, the updater sets the old-version pointer in the replacement data element to point to the old data element, and sets the new-version pointer in the replacement data element to NULL. If the new data element has a "deleted" flag set (see below), this flag is cleared. In step 58, the new-version pointer of the old data element is set to reference the replacement data element. In step 60, the updater executes appropriate memory-barrier instructions if required by the underlying computer hardware. In step 62, the updater changes all link pointers that point to the old data element to instead point to the replacement data element. Any searches performed at this point will arrive at the replacement data element, but will move to the old data element due to the fact that the global generation number has not yet been updated. In step 64, the updater increments the global generation number. In step 66, the updater causes the old data element to be freed after a grace period elapses. This can be done using the callback registration method of U.S. Pat. No. 5,727,209, referred to by way of background above, or by any other suitable means.

Figure 10:
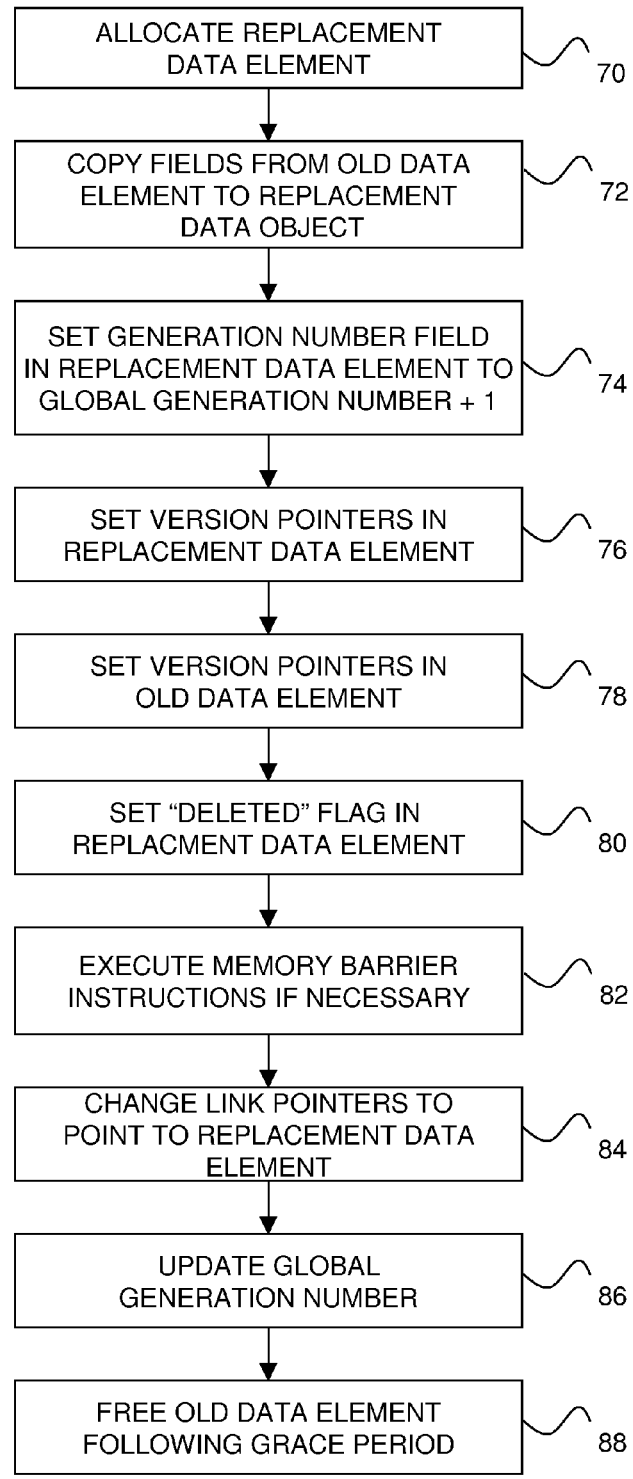
FIG. 10 is a flow diagram showing an exemplary method for deleting a group data element in accordance with the invention.

FIG. 10 is a flow diagram illustrating the update logic that may be used to delete a data element in accordance with the invention. Deleting a data element in a data element group can be performed by creating a replacement data element corresponding to the old data element to be deleted and setting a "deleted" flag in the new version. Actual deletion then proceeds by replacing the old (to-be-deleted) data element with the copy that has the "deleted" flag set. As with the data element replacement method described above, some form of mutual exclusion is required, such locking or wait-free synchronization.

Thus, in steps 70, 72 and 74, an updater (such as the updater $18_1$ of FIG. 4) respectively allocates a replacement data element, copies the corresponding fields from the old data element to the new version, and fills in the latter's generation-number field with a value that is one greater than the current value of the global generation number. In step 76, the updater sets the old-version pointer in the replacement data element to point to the old data element, and sets the new-version pointer in the replacement data element to NULL. In step 78, the updater sets the new-version pointer of the old data element to reference the replacement data element. In step 80, the updater sets the "deleted" flag in the replacement data element. In step 82, the updater executes appropriate memory-barrier instructions if required by the underlying computer hardware. In step 84, the updater changes all link pointers that point to the old data element to instead point to the replacement data element. Any searches performed at this point will arrive at the replacement data element, but will move to the old data element due to the fact that the global generation number has not yet been updated. In step 86, the updater increments the global generation number. In step 88, the updater causes both the old data element and the new data element to be freed after a grace period elapses.

Figure 11:
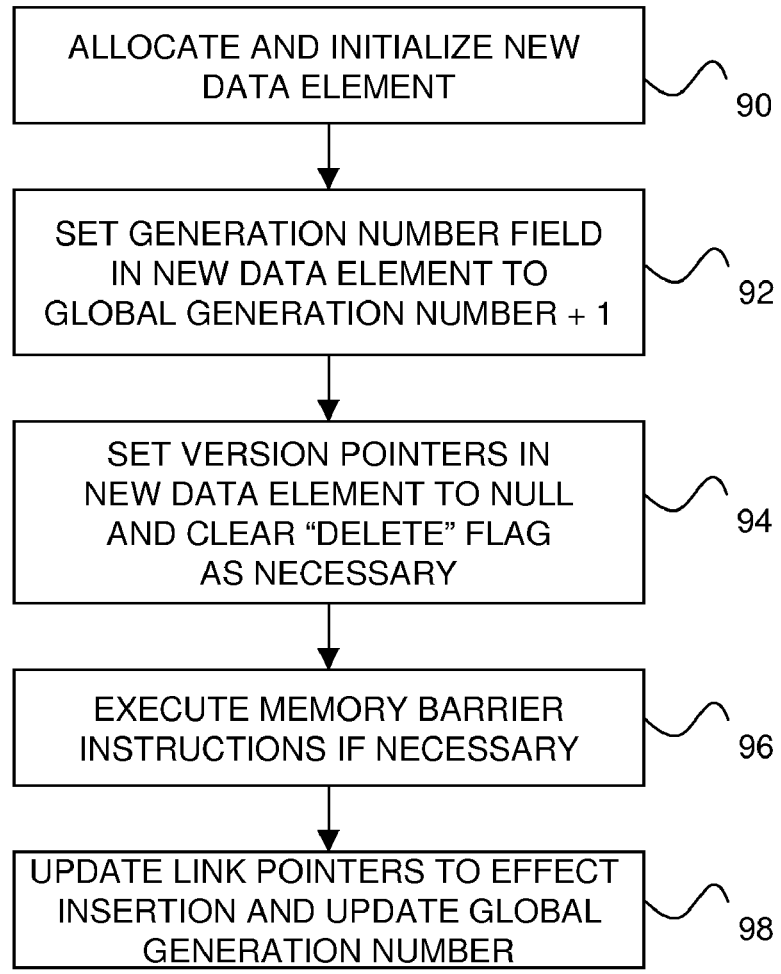
FIG. 11 is a flow diagram showing an exemplary method for inserting a group data element in accordance with the invention.

Another way in which a data element group can be updated is by way of insertion of a new data element. There are a number of ways to handle insertion, depending on the situation. In all cases, some form of mutual exclusion is required, such as locking or wait-free synchronization. FIG. 11 is a flow diagram illustrating the update logic that may be used to insert a data element in accordance with the invention when the data element group is searched using keys. For this type of search, when the reader finds a data element corresponding to something that does not yet exist (from the reader's perspective), it will simply act as if the search key did not match. In steps 90 and 92, the updater respectively allocates and initializes a new data element, including all of its pointers, and fills in the generation number field with a value that is one greater than the current value of the global generation number. In step 94, the updater sets both the old-version and new-version pointers in the new data element to NULL. If the new data element has a "deleted" flag set, this flag is cleared. In step 96, the updater executes appropriate memory-barrier instructions if required by the underlying computer hardware. In step 98, the link pointers needed to insert the new data element in the group are updated, and the global generation number is incremented. Following a grace period, all readers will see the newly inserted data element.

Another way to perform insertions is to only insert new data elements at NULL link pointers. The method shown in FIG. 11 works in this case, but a current generation reader must act as though a NULL pointer was encountered rather than just skipping when a new data element without an old version is encountered (see below).

Figure 12A:
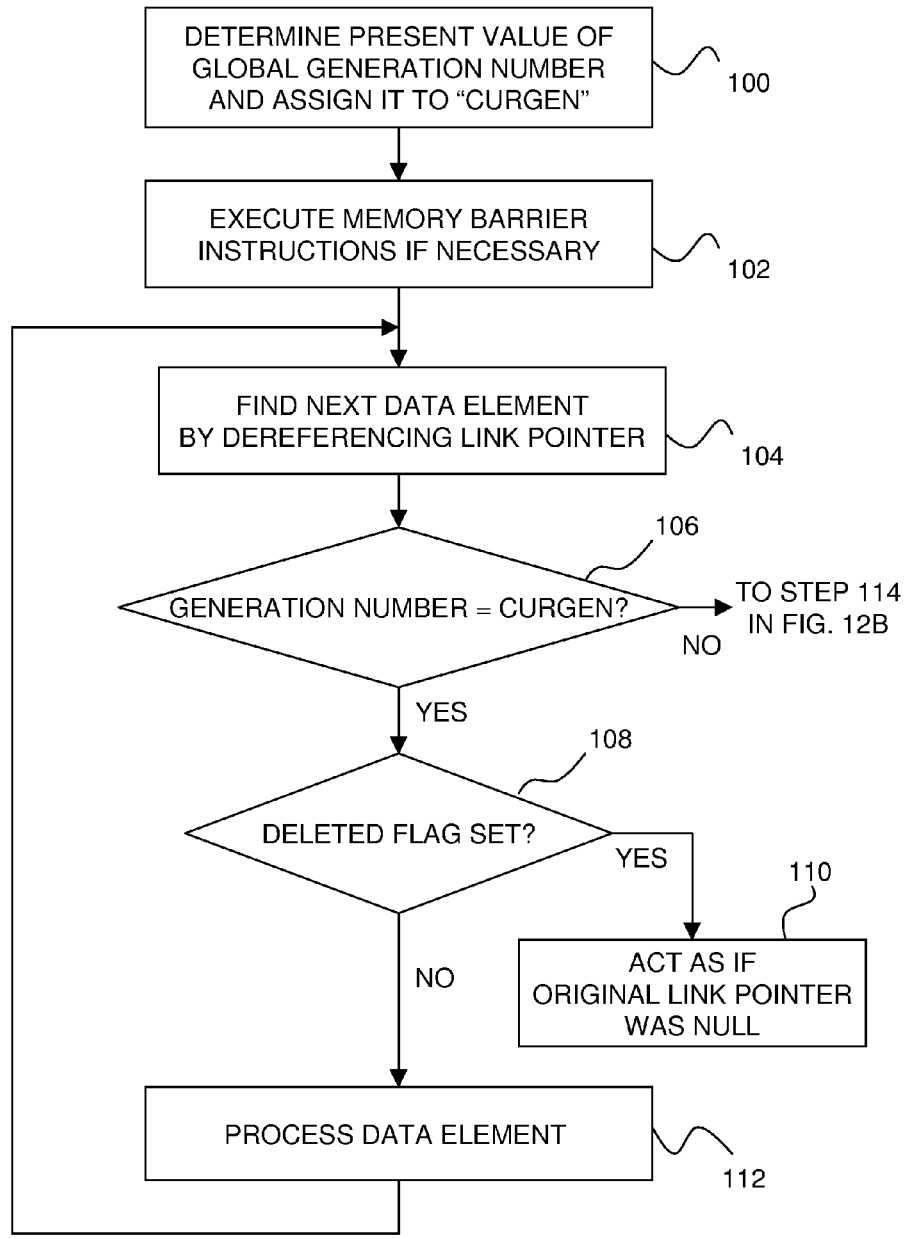
FIGS. 12A-12C represent a flow diagram showing an exemplary method for searching a data element group in accordance with the invention.
Figure 12B:
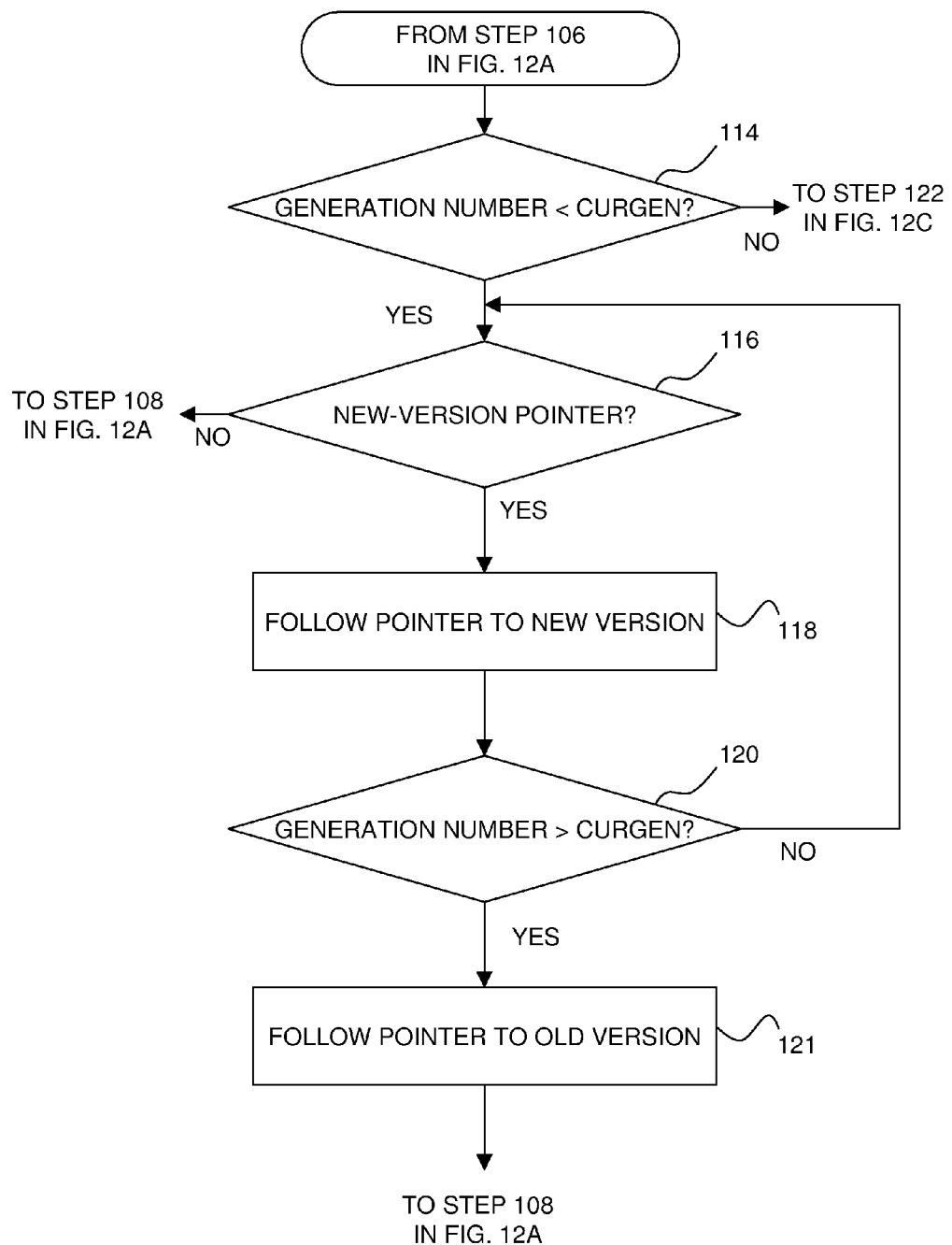
Figure 12C:
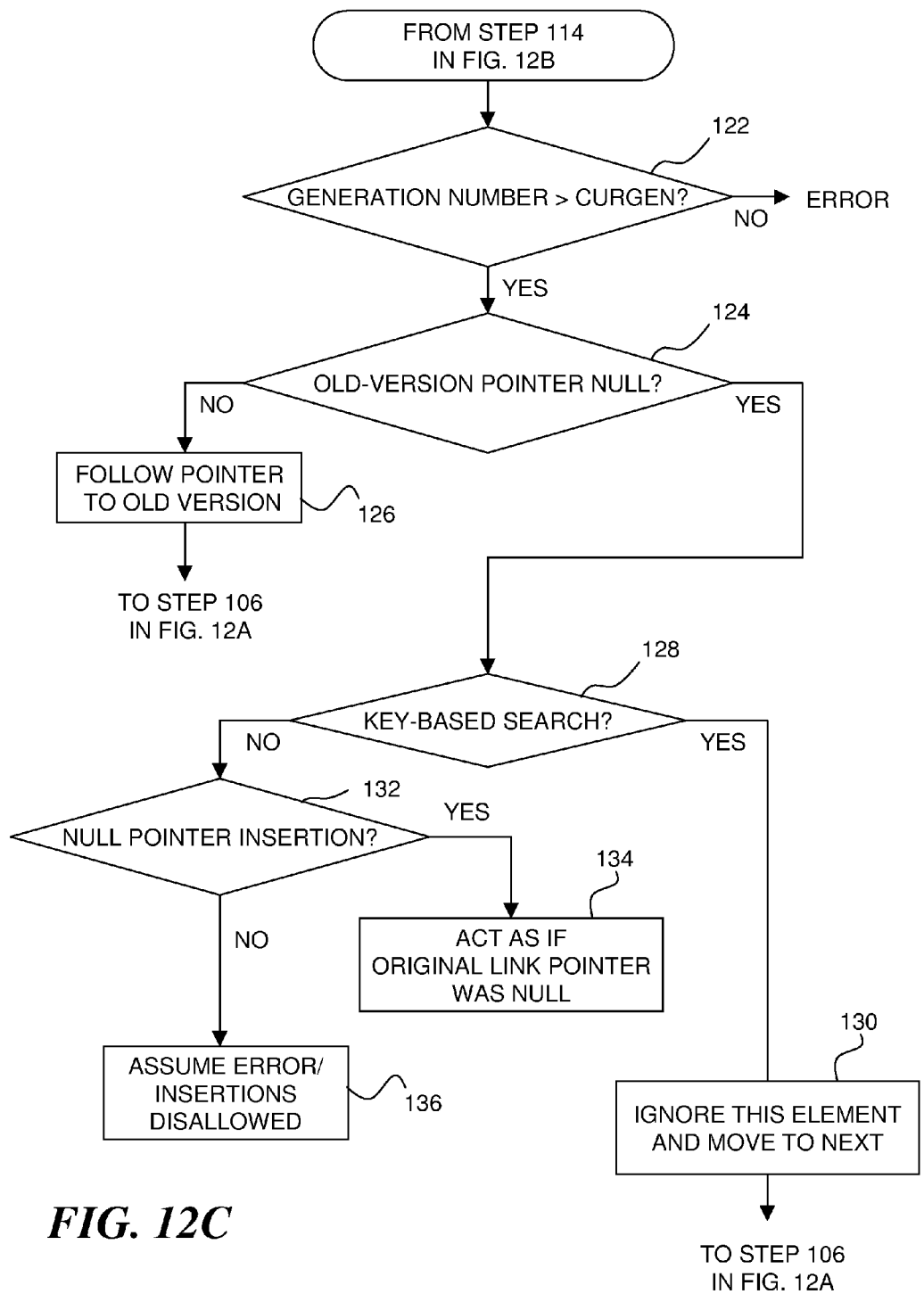

Turning now to FIGS. 12A-12C, a flow diagram is shown to illustrate the logic that may be used by readers to traverse a data element group in accordance with the invention. As previously discussed in connection with the generalized search method of FIG. 7, the basic steps are as follows:

1) maintain a global generation number that is incremented each time that a data element is updated;

2) maintain version pointers from each data element to any old and new versions;

3) in each data element, keep a snapshot of the global generation number corresponding to the time that it was added; and 4) when searching, snapshot the value of the global generation number at the beginning of the search, and traverse the links to the old and new data element versions as needed to find versions of each data element corresponding to the time of the search.

In step 100 of FIG. 12A, a reader, such as the any of the readers $18_2 \ldots 18_n$ of FIG. 4, determine the present value of the global generation number, and assign it to a local variable that shall be named "curgen." In step 102, the reader execute any memory-barrier instructions required by the underlying computer hardware to ensure that curgen is stored. Note that this imposes more overhead than conventional read-copy updates wherein readers are not required to execute memory-barrier instructions. Such overhead, however, is still preferable to conventional locking or wait-free synchronization, where not only memory barriers but also atomic instructions and writes to shared memory are required.

In step 104, the reader locates a data element to read by dereferencing a pointer internal to the data element group. If in step 106, the data element's generation number matches curgen, the reader checks in step 108 whether the data element's deleted flag is set. If it is, then in step 110 the reader acts as if the original link pointer had been NULL. If the deleted flag is not set, the reader processes the data element in step 112, then returns to step 104 to find the next data element.

If in step 106, the data element's generation number does not match curgen, the reader moves to step 114 (see FIG. 12B) and tests whether the generation number is less than curgen. If it is, then in step 116, the reader tests whether there is a new-version pointer. If there is not, the reader proceeds to step 108. Assuming there is a new-version pointer in step 116, the reader needs to find the data element with the largest generation number that is less than or equal to curgen. Thus, in step 118, the reader follows the new-version pointer to the next version of the data element and tests in step 120 whether the reader has over shot the mark by finding a generation number greater than curgen. If it has, then in step 121 the reader follows the old-version pointer back to the previous version and moves to step 108 to process this version of the data element. If the reader does not find a generation number in step 120 that exceeds curgen, it loops back to step 116 to test the next generation data element, if it exists.

If the data element's generation number is not found to be less than curgen in step 114, the reader tests in step 122 (see FIG. 12C) to determine if the generation number is greater than curgen. Assuming it is (otherwise there is an error), the reader tests in step 124 whether the data element's old-version pointer is NULL. If not, the readers follows this pointer to the old version of the data element in step 126, then returns to step 106. If in step 124, the old-version pointer is not NULL, special handling is required depending on whether key-based searching is being used, or if the data element was inserted by substituting it for a NULL link pointer.

If in step 128, the reader is performing a key-based search, then in step 130 the reader ignores the data element and moves to the next one, as if there had been a key mismatch. The reader then returns to step 106. If in step 128, the reader is not performing a key-based search, then the reader's next action depends on whether in step 132 the data element was inserted by substituting a NULL link pointer. If it was, then the reader in step 134 acts as if it encountered the original NULL link pointer. If in step 132 the data element was not inserted at a NULL pointer, then in step 136 an error condition exists based on the insertion being disallowed.

In some cases, it may be necessary to maintain multiple sets of old/new version pointers, potentially one set for each link pointer that points to a data element. A simpler way of handling this in some cases will be to use "pointer-forwarding" entities, similar to those used by some dynamic linkers. The pointer forwarding entities can be implemented as a C-language "struct" variables or using any other suitable programming construct. Each such entity will contain a link pointer to an actual data element, a snapshot of the global generation number, and pointers to old and new versions of that pointer-forwarding entity. The pointer-forwarding entity may also contain pointers used to locate other pointer-forwarding entities referencing the same data element or referenced by the same data element, as well as a pointer to the data element referencing this pointer-forwarding entity.

If the data elements in a data element group uniformly use pointer-forwarding entities, there will be an extra level of indirection on each pointer. This adds overhead and cache pressure, but permits pointers to be changed arbitrarily, while still preserving all the old paths through the data element group. This approach may therefore be used as a general replacement, though other schemes may work better in specific cases.

Figure 13:
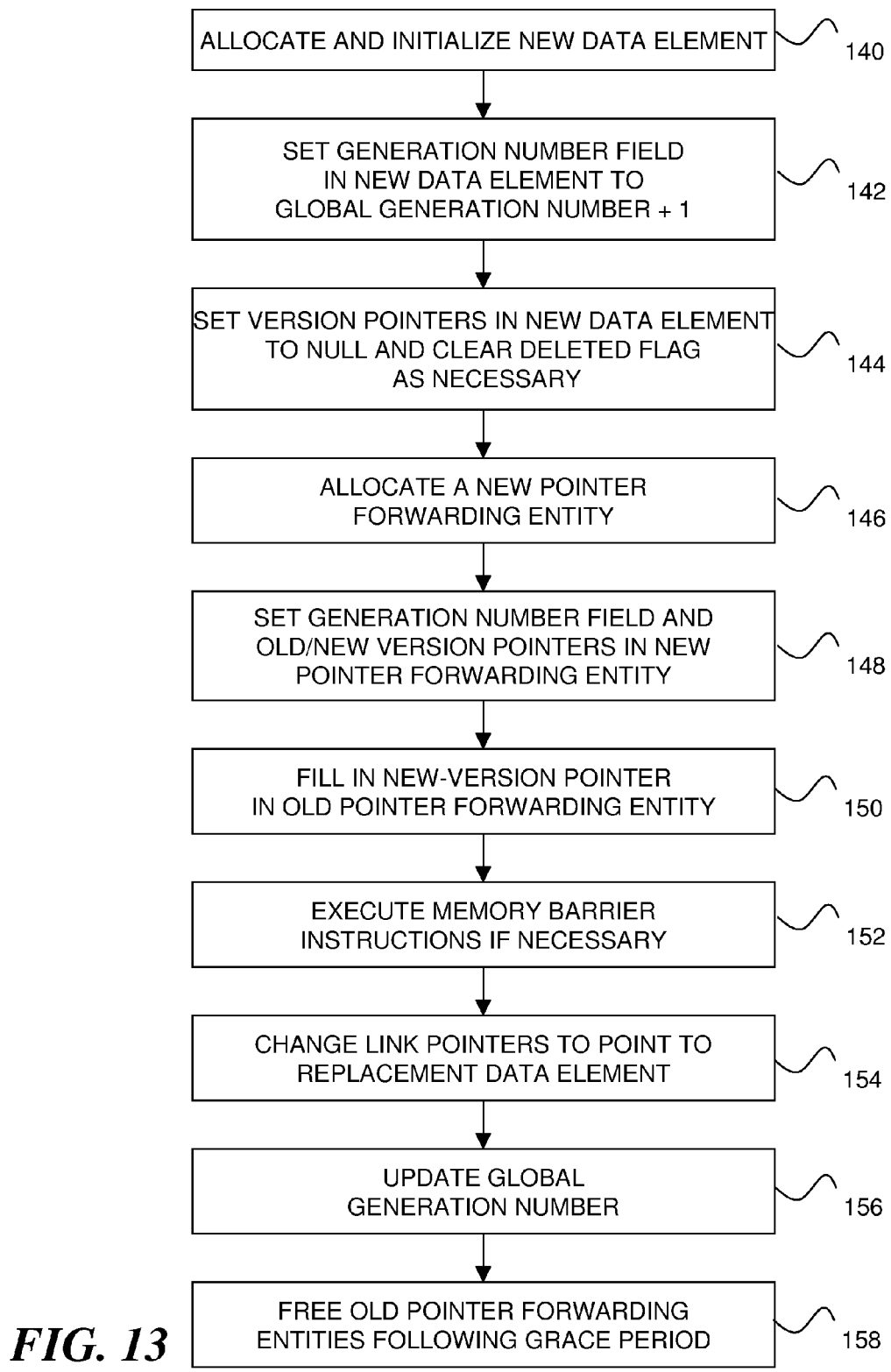
FIG. 13 is a flow diagram showing an exemplary method for performing data element updates using pointer forwarding entities in accordance with the invention.

FIG. 13 illustrates how updates can be performed using pointer-forwarding entities. In steps 140 and 142, an updater allocates and initializes a new data element, then fills in the latter's generation-number field with a value that is one greater than the current value of the global generation number. In step 144, the updater sets both the old and new version pointers in the new data element to NULL. If the new data element has a "deleted" flag set (see below), this flag is cleared. All pointer-forwarding entities that now need to point to the new data element are replaced in the following manner. In step 146, the updater allocates a replacement pointer-forwarding entity. In step 148, the updater fills in the latter's generation-number field with a value that is one greater than the current value of the global generation number, sets the old-version pointer to point to the old pointer-forwarding entity, and sets the new-version pointer to NULL.

In step 150, the updater fills in the new-version pointer in the old pointer forwarding entity to point to the new pointer forwarding entity. In step 152, the updater executes appropriate memory-barrier instructions if required by the underlying computer hardware. In step 154, the updater changes all link pointers that point to the old pointer forwarding entity to instead point to the new pointer forwarding entity. Any searches performed at this point will arrive at the new pointer forwarding entity, but will move to the old pointer forwarding entity due to the fact that the global generation number has not yet been updated. In step 156, the updater increments the global generation number. In step 158, the updater causes the old pointer forwarding entities to be freed after a grace period elapses.

Turning now to FIGS. 14A-14E, the use of pointer forwarding entities is presented in the context of a circular linked list 160. The linked list comprises three data elements A, B and C in that order. There is also a global list head pointer forwarding entity P(h) that points to data element A, and three additional pointer forwarding entities P(A), P(B) and P(C) respectively pointing from data elements A, B and C to data elements B, C and A. It is assumed that data elements A and B are to be interchanged in the list 160. One way to make this change would be to allocate new copies of A, B, and C, then update their pointers and version number, proceeding as one would for a normal atomic replacement of these three elements. However, it is sometimes desirable to switch the two elements without creating new copies. Pointer-forwarding entities allow the updater to accomplish the goal, and the present example thus illustrates a further benefit of the pointer-forwarding approach.

Figure 14A:
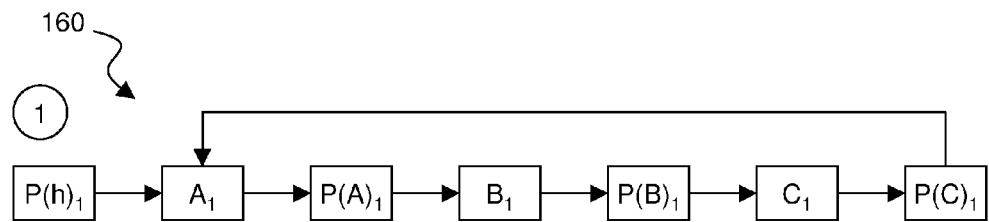
FIGS. 14A-14E are diagrammatic representations of a group of data elements implemented as a circular list during various stages of an update operation in which elements A and C are interchanged using pointer forwarding entities in accordance with another exemplary implementation of the invention.
Figure 14B:
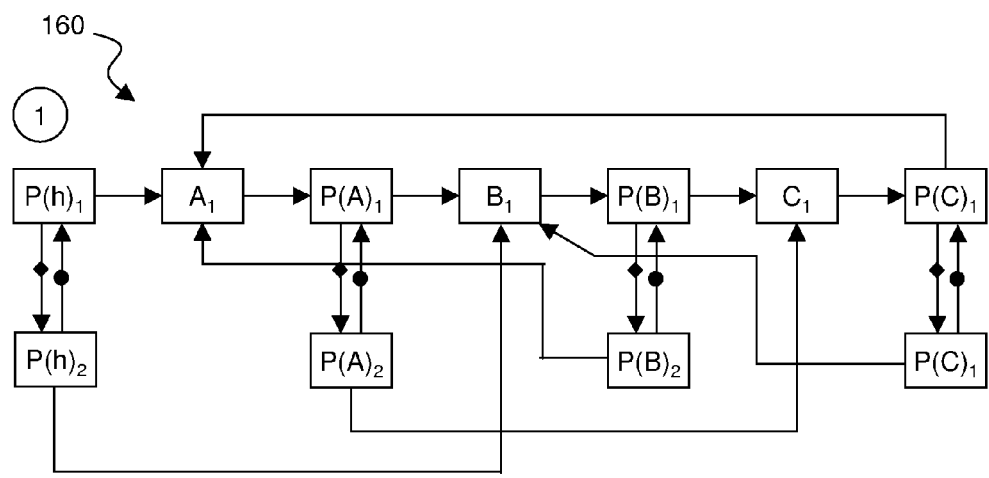

FIG. 14A shows the initial state of the list 160, with the subscripts representing generation numbers, and the circled number on the left-hand side of the figure representing the global generation number. To exchange data elements A and B, the generalized method of FIG. 13 can be used. Note, however, that steps 140-144 directed to the creation of new data elements are not required because A and B are simply going to be interchanged rather than updated. As shown in FIG. 14B, the first step in the interchange process is to create a new set of pointer-forwarding entities that arrange the list in the new order of B, A, C. Note that readers will not encounter the new pointer-forwarding entities because the old pointer-forwarding entities still match the global generation number.

Figure 14C:
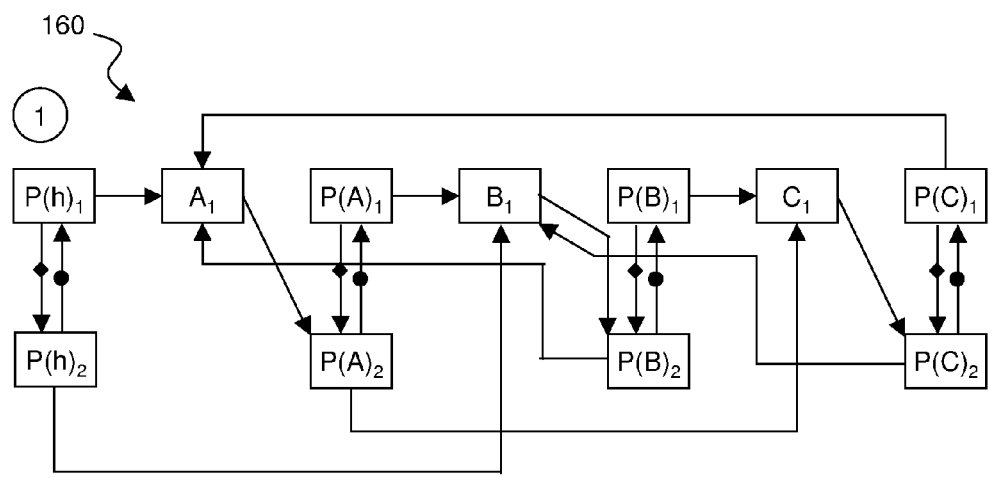

At this point, appropriate memory barrier instructions are executed if required by the hardware to commit the contents of the new pointer-forwarding entities to memory. As shown in FIG. 14C, all link pointers from the data elements A, B and C may now be updated to point to the new versions of the pointer-forwarding entities. Readers will thus encounter the new pointer-forwarding entities. Note, however, that first generation readers will still follow the old-version pointers back to the old pointer-forwarding entities due to version-number mismatch.

Figure 14D:
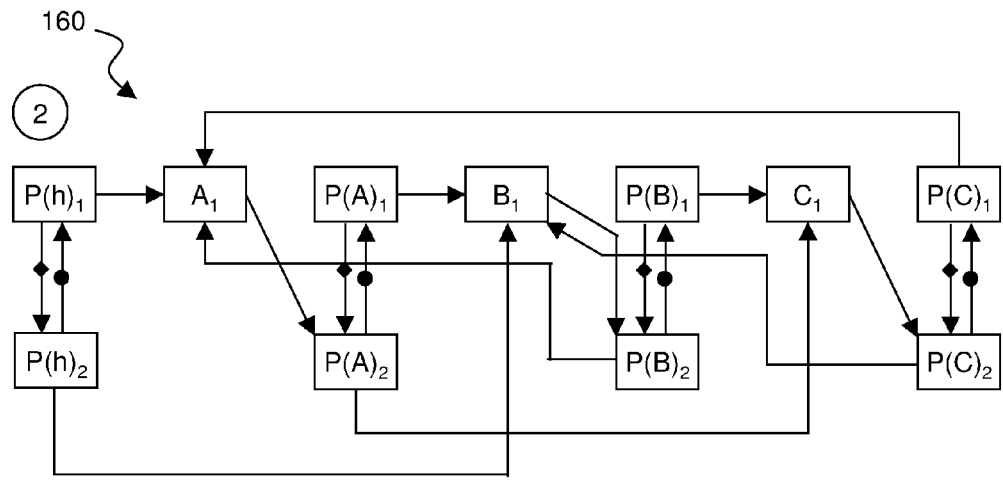

As shown in FIG. 14D, the global generation number is incremented. Assuming no memory barrier instructions are executed at this point, readers may see the pointer and global generation number updates in any order. However, readers will follow the old/new version pointers in the pointer-forwarding entities as needed based on the global generation number snapshot assigned to the search (curgen).

Figure 14E:
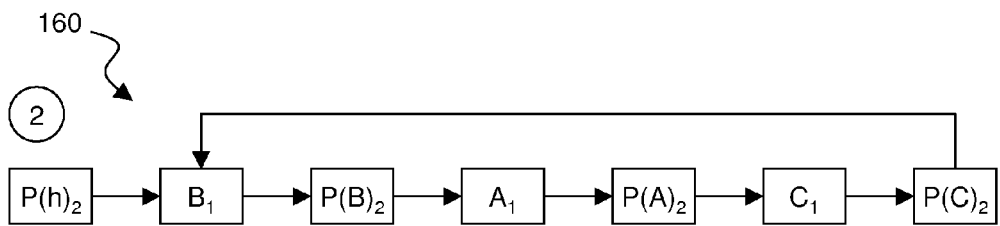

As shown in FIG. 14E, after a grace period elapses, the old pointer-forwarding entities may be freed and the old-version and new-version pointers are NULLed.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A data processing system having one or more central processing units, a memory and a communication pathway between the one or more central processing units and the memory, said system being adapted to update a shared data element group in said memory while preserving group integrity on behalf of one or more readers that are concurrently referencing group data elements without using locks or atomic instructions, and comprising:
    means for generating a new group data element;
    means for assigning a new generation number to said new data element that is different than an existing global generation number associated with said data element group and which allows a reader of said data element group to determine whether said new data element is a correct version for said reader;
    means for establishing a first version link from said new data element to a prior version thereof;
    means for establishing a second version link from said prior version to said new data element;
    means for linking said new data element into said data element group so that it is reachable by readers;
    means for updating said global generation number associated with said data element group to correspond to said new generation number; and
    means for freeing said prior version and said first and second version links following a grace period.

2. A system in accordance with claim 1 wherein said system is adapted to replace a group data element and to generate said new data element by copying said data element to be replaced.

3. A system in accordance with claim 1 wherein said system is adapted to delete a group data element and to generate said new data element by copying said data element to be deleted and setting a deletion flag in said new data element.

4. A system in accordance with claim 1 wherein said system is adapted to insert a new group data element such that said new data element has no prior versions.

5. A system in accordance with claim 1 wherein said system further includes means for generating a pointer-forwarding entity that points to said new data element, said pointer forwarding entity maintaining said version link on behalf of said new data element and further being used to link said new data element into said data element group.

6. A data processing system having one or more central processing units, a memory and a communication pathway between the one or more central processing units and the memory, said system being adapted to perform a search of a shared data element group that may be undergoing modification by the system the system of claim 1, and comprising:
    means for assigning a current global generation number to said search;
    means for determining, when referencing a data element in said data element group, whether said referenced data element is a correct version by comparing a generation number assigned to said referenced data element with said search generation number; and
    means for searching for a correct version of said referenced data element as necessary.

7. A system in accordance with claim 6 wherein said system is adapted to accept said referenced data element for reading as a correct version if said data element generation number is equal to said search generation number.

8. A system in accordance with claim 6 wherein said system is adapted to search for a later version of said referenced data element if said data element generation number is less than said search generation number, and to use said referenced data element if a later version is not found.

9. A system in accordance with claim 6 wherein said system is adapted to search for a prior version of said referenced data element if said data element generation number is greater than said search generation number, and to deem said referenced data element to be a new insertion if there is no prior version.

10. A data processing system having one or more central processing units, a memory and a communication pathway between the one or more central processing units and the memory, said system being adapted to update a shared data element group in said memory while preserving group integrity on behalf of one or more readers that are concurrently referencing group data elements without using locks or atomic instructions, and comprising:
    means for generating a pointer-forwarding entity that points to a data element in said data element group;
    means for assigning a new generation number to said pointer-forwarding entity that is different than an existing global generation number associated with said data element group and which allows a reader of said data element group to determine whether said pointer-forwarding entity is a correct version for said reader;
    means for establishing a first version link from said pointer-forwarding entity and a prior version thereof;
    means for establishing a second version link from said prior version to said pointer-forwarding entity;

means for linking said pointer-forwarding entity into said data element group so that said data element pointed to by said pointer-forwarding entity is reachable by readers through said pointer-forwarding entity;

means for updating said global generation number associated with said data element group to correspond to said new generation number; and means for freeing said prior version and said first and second version links following a grace period.

11. A computer program product for updating a shared data element group while preserving group integrity on behalf of one or more readers that are concurrently referencing group data elements without using locks or atomic instructions, comprising:

one or more data storage media;

means recorded on said data storage media for programming a data processing platform to operate as by:

generating a new group data element;

assigning a new generation number to said new data element that is different than an existing global generation number associated with said data element group and which allows a reader of said data element group to determine whether said new data element is a correct version for said reader;

establishing a first version link from said new data element to a prior version thereof;

establishing a second version link from said prior version to said new data element;

linking said new data element into said data element group so that it is reachable by readers;

updating said global generation number associated with said data element group to correspond to said new generation number; and freeing said prior version and said first and second version links following a grace period.

12. A computer program product in accordance with claim 11 wherein said product is adapted to replace a group data element and to generate said new data element by copying said data element to be replaced.

13. A computer program product in accordance with claim 11 wherein said product is adapted to delete a group data element and to generate said new data element by copying said data element to be deleted and setting a deletion flag in said new data element.

14. A computer program product in accordance with claim 11 wherein said product is adapted to insert a new group data element such that said new data element has no prior versions.

15. A computer program product in accordance with claim 11 wherein said means recorded on said data storage media are further adapted to generate a pointer-forwarding entity that points to said new data element, said pointer forwarding entity maintaining said version link on behalf of said new data element and further being used to link said new data element into said data element group.

16. A computer program product for performing a search of a shared data element group that may be undergoing modification in accordance with the method of claim 11, comprising:

one or more data storage media;

means recorded on said data storage media for programming a data processing platform to operate as by:

assigning a current global generation number to said search;

when referencing a data element in said data element group, determining whether said referenced data element is a correct version by comparing a generation number assigned to said referenced data element with said search generation number; and searching for a correct version of said referenced data element as necessary.

17. A computer program product in accordance with claim 16 wherein, if said data element generation number is equal to said search generation number, said referenced data element is accepted for reading as a correct version.

18. A computer program product in accordance with claim 16 wherein, if said data element generation number is less than said search generation number, a search is made for a later version of said referenced data element, and wherein said referenced data element is used if a later version is not found.

19. A computer program product in accordance with claim 16 wherein, if said data element generation number is greater than said search generation number, a search is made for a prior version of said referenced data element, and wherein said referenced data element is deemed to be a new insertion if there is no prior version.

20. A computer program product for updating a shared data element group while preserving group integrity on behalf of one or more readers that are concurrently referencing group data elements without using locks or atomic instructions, comprising:

one or more data storage media;

means recorded on said data storage media for programming a data processing platform to operate as by:

generating a pointer-forwarding entity that points to a data element in said data element group;

assigning a new generation number to said pointer-forwarding entity that is different than an existing global generation number associated with said data element group and which allows a reader of said data element group to determine whether said pointer-forwarding entity is valid for said reader;

establishing a first version link from said pointer-forwarding entity and a prior version thereof;

establishing a second version link from said prior version to said pointer-forwarding entity;

linking said pointer-forwarding entity into said data element group so that said data element pointed to by said pointer-forwarding entity is reachable by readers through said pointer-forwarding entity;

updating said global generation number associated with said data element group to correspond to said new generation number; and freeing said prior version and said first and second version links following a grace period.

21. A computer program product for managing a shared data element group so as to allow updates thereof while preserving group integrity on behalf of one or more readers that are concurrently referencing group data elements without using locks or atomic instructions, comprising:

one or more data storage media;

means recorded on said data storage media for programming a data processing platform to operate as by:

performing a first-phase update operation that preserves a consistent pre-update view of said data element group on behalf of pre-update readers and a consistent post-update view of the data element group on behalf of post-update readers;

providing means by which readers can locate all data elements of said data element group that belong to each of said pre-update and post-update views as readers search said data element group;

performing one or more read operations following said first-phase update operation in which one or more readers search said data element group with each reader referencing only data elements belonging to one of said pre-update and post-update views; and performing a second-phase update operation following a grace period that frees said pre-update view of said data element group.

* * * * *